United States Patent [19]

Kuznicki et al.

[11] Patent Number: 4,972,439
[45] Date of Patent: Nov. 20, 1990

[54] ACTIVE SIGNALLING TRANSMITTER CONTROL

[75] Inventors: William J. Kuznicki, Coral Springs; Robert J. Schwendeman, Pompano Beach, both of Fla.

[73] Assignee: Motorola, Inc., Schaumburg, Ill.

[21] Appl. No.: 299,187

[22] Filed: Jan. 19, 1989

[51] Int. Cl.⁵ ........................................... H04L 29/02
[52] U.S. Cl. ...................................... 375/60; 455/69; 379/63; 340/825.44
[58] Field of Search .................... 375/121, 3, 4, 60, 62, 375/59; 340/825.44, 825.47, 825.48, 825.72, 825.76; 455/53, 33, 52, 54, 69, 68, 43, 44, 92; 370/110.1; 379/63

[56] References Cited
U.S. PATENT DOCUMENTS

| | | | |
|---|---|---|---|
| 4,449,248 | 5/1984 | Leslie et al. | 455/53 |
| 4,518,961 | 5/1985 | Davis et al. | 340/825.44 |
| 4,613,990 | 9/1986 | Halpern | 455/69 |
| 4,642,632 | 2/1987 | Ohyagi et al. | 340/825.44 |
| 4,758,833 | 7/1988 | Dunkerton et al. | 340/825.44 |

Primary Examiner—Douglas W. Olms
Assistant Examiner—Marianne Huseman
Attorney, Agent, or Firm—Philip P. Macnak; Vincent B. Ingrassia; Anthony Sarli, Jr.

[57] ABSTRACT

A transmitter, having controllable transmission functions is described for transmitting coded message signals to a plurality of portable communications receivers, the coded message signals including and message information interleaved with transmitter control signals synchornized with the message information. The transmitter includes a receiving section for receiving the coded message signals from an input source for transmission. A decoder which couples to the receiving section decodes the synchronized transmitter control signals to derive transmission control signals. A transmitter section, responsive to the transmission control signals, transmits the coded message signals. Additional transmission control signals may also be derived from one or more receiver control signals embedded in the coded message signals.

20 Claims, 8 Drawing Sheets

SINGLE TRANSMITTER SITE

TABLE I

| SPEED | WORD IDENTITY |
|---|---|
| 1200 | $\overline{W1}$ W2 W3 $\overline{W4}$ |
| 2400 | $\overline{W1}$ $\overline{W2}$ $\overline{W3}$ W4 |
| 4800 | W1 W2 $\overline{W3}$ $\overline{W4}$ |

WHERE W1=13, W2=2, W3=20, W4=1

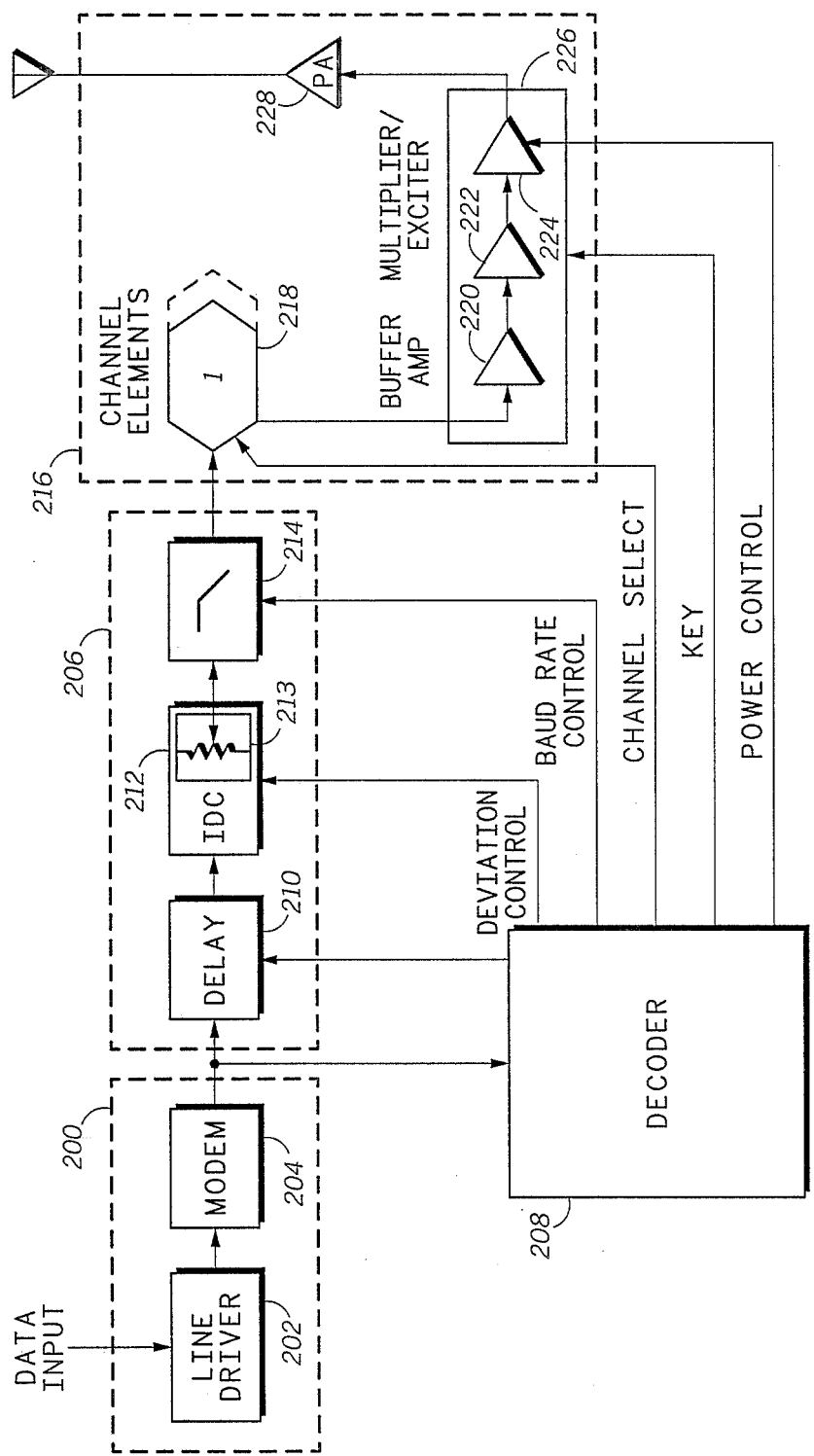
FIG. 3 SINGLE TRANSMITTER SITE

ACTIVE SIGNALLING TRANSMITTER CONTROL

FIELD OF THE INVENTION

The present invention relates to electromagnetic wave transmitters for transmitting coded message signals, and more particularly to controlling electromagnetic wave transmitters using synchronized transmitter control signals interleaved with the message signals.

DESCRIPTION OF THE PRIOR ART

Prior art transmitter control systems have utilized analog and digital transmitter control signals at the beginning of the transmission to activate various transmitter functions, such as keying of the transmitter, and for identification of message or data type, such as analog or binary. These control signals were then followed after an appropriate time interval by the messages to be transmitted. Additional transmitter control signals were then transmitted identifying a new message or data type for the next group of messages or data to be transmitted, or to terminate the transmission. A prior art transmitter control of this type is described in U.S. Pat. No. 4,758,833 issued July 19, 1988 to Dunkerton et al. entitled "Paging Universal Remote Control Decoder" which is assigned to the assignee of the present invention. While this method of control has proven to be satisfactory for paging signaling formats, such as with 512 bit per second POCSAG or the 600 bit per second Golay Sequential Code (GSC) formats, it is not compatible with the requirements for transmission of higher speed signaling formats, required to greatly increase message throughput, such as will be required to transmit data in excess of 1200 bits per second. Control of such transmitter functions as deviation, premodulation filtering, and removal of modulation for predetermined time intervals with or without dekeying the transmitter will be required with the new high speed signaling formats. One such signaling format is described in U.S. Pat. No. 4,918,437 to Jasinski et al, issued Apr. 17, 1990, entitled "High Data Rate Simulcast Communications System", which is assigned to the assignee of the present application. The use of transmitter control signals which are in a non-related signaling format to the messages being transmitted, as described for the prior art, greatly reduces the system message throughput which can be gained with the higher speed signaling formats. Such transmitter control signals may also be redundant, as similar control signals are often required for controlling the receiver functions in the new high speed signalling formats. There is a need to be able to utilize transmitter control signals which are interleaved with the message information and which can be synchronized with the message information. There is further a need to utilize the receiver control signals and any other control signals which may also be embedded in the message information of higher speed signaling formats to provide additional control of the transmitter functions.

SUMMARY OF THE INVENTION

A transmitter, having controllable transmission functions is described for transmitting coded message signals to a plurality of portable communications receivers. The coded message signals include receiver address and message information interleaved with synchronized control signals for controlling transmitter and receiver operation. The coded message signals are received by the transmitter for transmission and the synchronized transmitter control signals are decoded by a decoder deriving transmission control signal. Further, transmission control signals may be derived from one or more of the receiver control signals embedded in the coded message signals. A transmitter section which is responsive to the transmission control signals transmits the coded message signals. Transmitter functions controlled include at least transmitter deviation, premodulation filtering, and modulation control.

It is an object of the present invention to provide a transmitter having increased transmitter control capabilities.

It is a further object of the present invention to provide a transmitter capable of decoding synchronized transmitter control signals interleaved with message information.

These and other objects and advantages of the present invention will become more apparent to those skilled in the art upon consideration of the following description of the invention.

BRIEF DESCRIPTION OF THE DRAWINGS

The features of the invention which are believed to be novel are set forth with particularity in the appended claims. The invention itself, together with its further objects and advantages thereof, may be best understood by reference to the following description when taken in conjunction with the accompanying drawings, in the several figures of which like reference numerals identify identical elements.

FIG. 3 is a electrical block diagram of the transmitter of the preferred embodiment of the present invention.

DETAILED DESCRIPTION OF THE INVENTION

Figure 1:
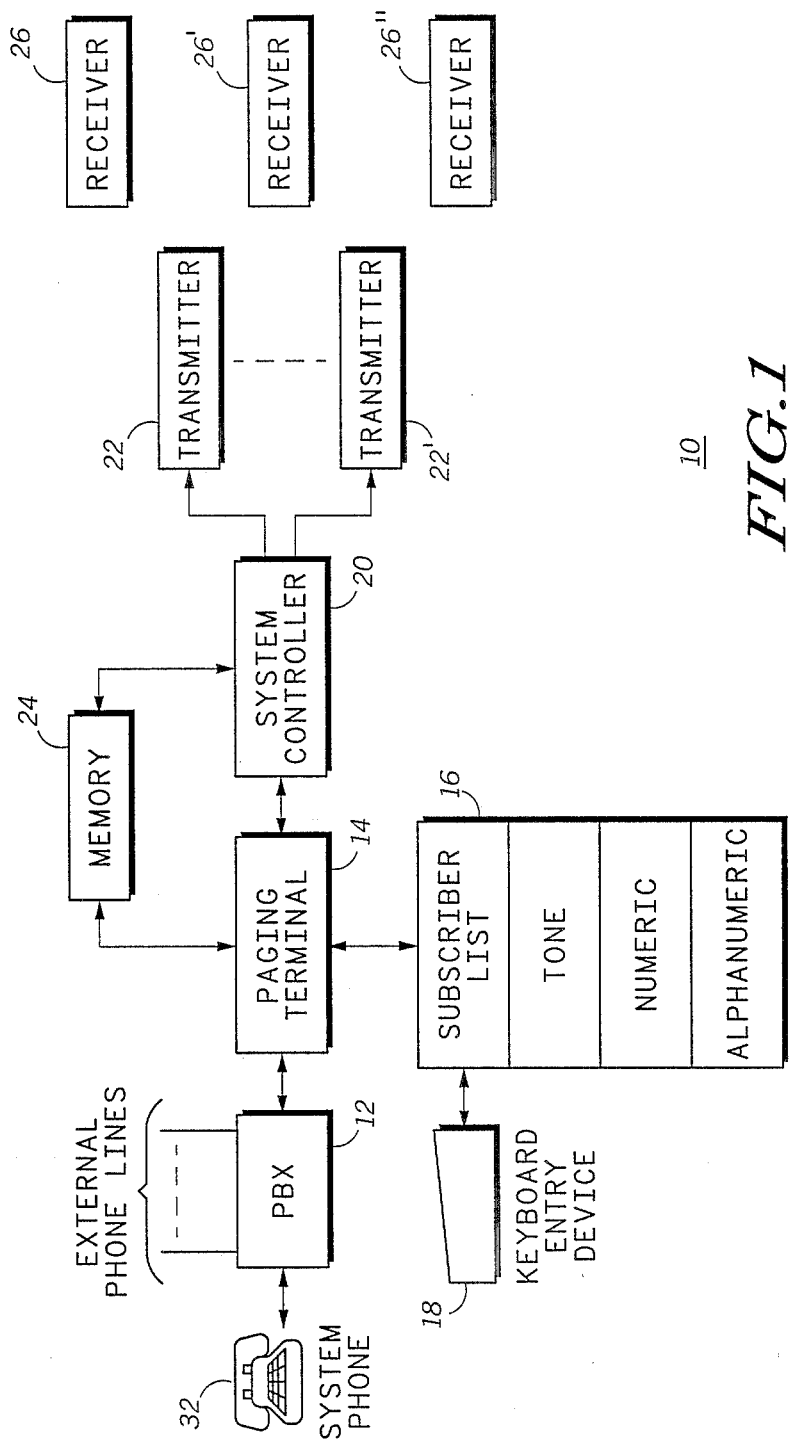
FIG. 1 is an electrical block diagram of a typical high speed paging system utilizing the transmitter of the present invention.

With respect to the figures, FIGS. 1 through 6 illustrate in general the preferred embodiment of the present invention. Referring to FIG. 1, a communication system 10, capable of transmitting messages to a plurality of selective call communications receivers, or pagers, at a plurality of data bit rates is shown. Such a system looks much like a conventional paging system, however, the differences will become apparent shortly with the 0 description to follow. Messages are entered into system 10 using conventional rotary dial or touch tone telephones through PBX 12 for tone only paging or numeric messages, or using an alphanumeric entry device for alphanumeric messaging. Messages may also directly be entered using the system phone 32 located at the site of terminal 14 through PBX 12. Terminal 14 formats the received message with the appropriate communication receiver, or pager, address stored in subscriber list 16. Subscriber list 16 is a nonvolatile memory file, such as a hard disk file, of all users operational in the system. Subscriber list 16 stores pager addresses and page type associated with the particular addresses, either tone only, numeric or alphanumeric. The subscriber list 16 is updated, and new pagers added to the system using keyboard entry device 18.

Unlike the prior art paging systems, the coded message signals are transmitted in a signaling format, including the pager address, or address signals, and message, or message signals, formatted with control signals for controlling transmitter functions by system controller 20. The transmitter control signals may be transmitted as separate information bits interleaved with the message information and at the same or a different baud rate as the message information. In either case, the transmitter control signal data rate is synchronized with the message information to allow decoding of either the transmitter control signals or message information without the necessity to resynchronize on the data being processed, except as described later in the specification. The transmitter control signals may also be embedded in the message information, such as receiver control signals to be described in detail shortly, which provide both receiver and transmitter control information. Unlike prior art tone and digital transmitter control signals, which are independent of the message information, the transmitter control signals described in the preferred embodiment of the present invention can be formatted with the message information with only minimal delays incurred during decoding of the transmission control signals and transmission of the message information. The transmitter control signals may also be transmitted with the message information without interfering with the message reception of the portable communications receivers. The function of these control signals will become more apparent in the discussion to follow. Transmitters, or transceivers, 22, are coupled to system controller 20 via a communications link, such as a telephone line or link transmitter (not shown). The choice of a transmitter, or transceiver, is dependent upon whether the receivers utilized in the system are capable of providing an acknowledgement signal for acknowledging the receipt of the address. While two transmitters are shown in FIG. 1, it will be appreciated small systems may utilize only a single transmitter, whereas larger systems may utilize a substantially greater number of transmitters to provide wide area coverage. The coded message signals are transmitted via an RF (radio frequency) signal by transmitters 22, 22', to portable communication receivers, or pagers 26, 26' and 26Δ, three of which are shown by way of example only. The pager 26, 26' or 26Δ to which the message is directed receives and stores the message in a manner well known to one of ordinary skill in the art, alerting the user of the message and displaying the message when appropriate.

Figures 2A, 2B:
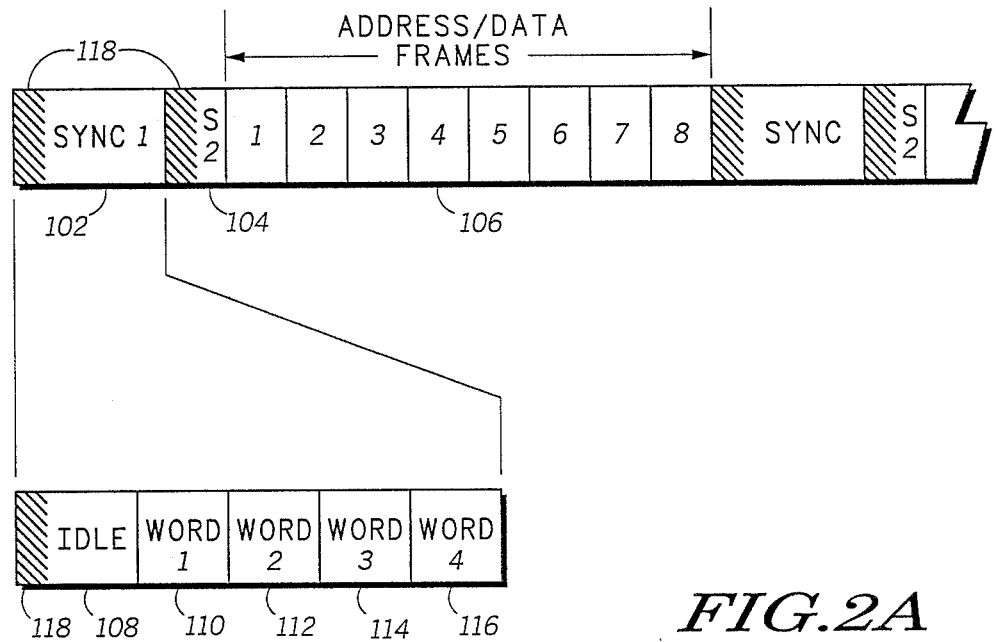
FIGS. 2A, 2B and 2C are diagrams showing the signaling format for the preferred embodiment of the present invention.
Figure 2C:
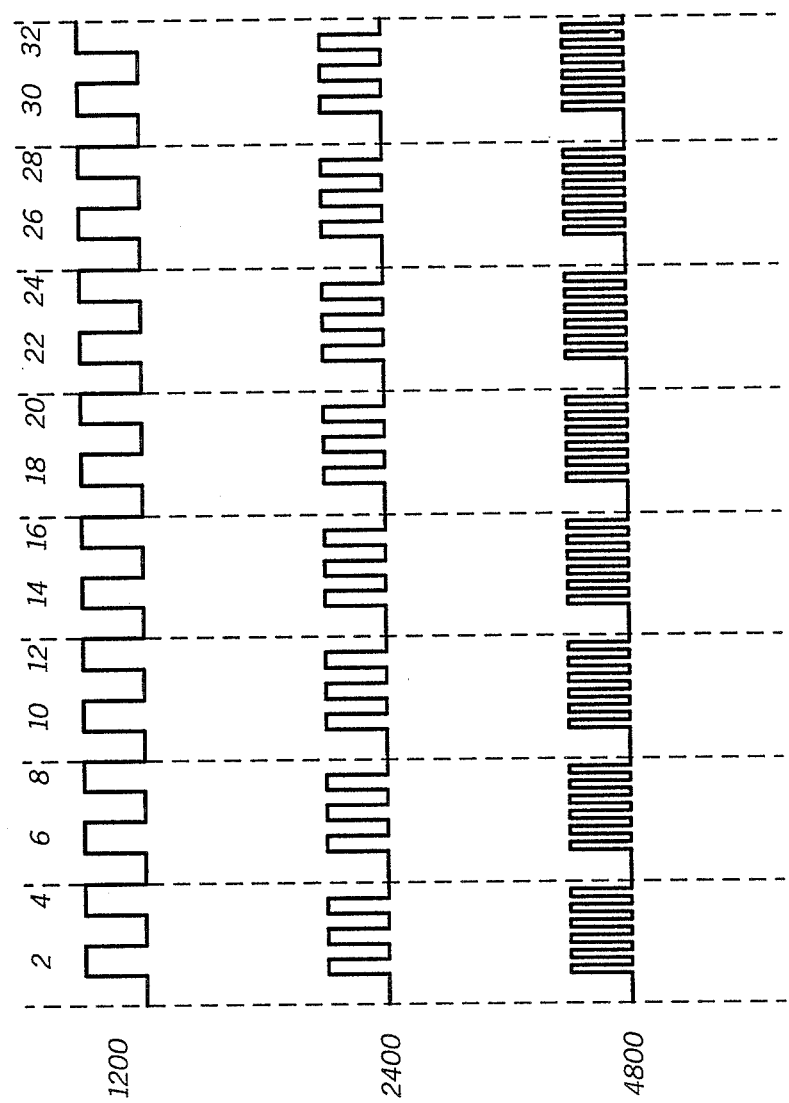

Reference is directed to FIGS. 2A and 2C which show diagrams of the signaling format of the coded message signals providing embedded transmitter control functions synchronized with the message information. Referring specifically to FIG. 2A, the coded message signals include a sync 1, or first synchronization codeword 102, followed by a sync 2 (S2), or second synchronization codeword 104. In the preferred embodiment of the present invention, the first synchronization codeword 102 is transmitted at a fixed data bit rate of 1200 bits per second, whereas the second synchronization codeword is transmitted at a variable data bit rate of 1200, 2400 or 4800 bits per second which corresponds to the data bit rate at which the address and message information to follow is to be transmitted. Eight address/data frames 106 follow the second synchronization codeword 104, providing receiver battery saving groups in a manner well known to one of ordinary skill in the art. It will be appreciated the number of address/data frames provided is by way of example, and a greater number or a lesser number may be provided, depending upon the receiver battery life requirements and message throughput.

The data bit rate of first synchronization codeword 102 is chosen to provide reliable simulcast address transmission and maximize receiver sensitivity, and it will be appreciated that other data bit rates higher or lower than described for the preferred embodiment of the present invention may be utilized, with appropriate consideration for the design of the transmitter and receiver elements, for the same purpose. First, synchronization codeword 102 includes an idle codeword 108, a word 1 codeword 110, a word 2 codeword 112, a word 3 codeword 114 and a word 4 codeword 116. In the preferred embodiment of the present invention, idle codeword 108 is a forty bit binary word having a preselected bit pattern which provides receiver bit and word synchronization at 1200 bits per second in a manner well known to one on ordinary skill in the art. It will be appreciated that the length of idle codeword 108 may be longer or shorter depending on the requirements of the synchronization algorithm to obtain bit and word synchronization. In the preferred embodiment of the present invention, word 1 codeword, word 2 codeword, word 3 codeword, and word 4 codeword provide one or more receiver control signals decodable by the receiver for controlling the reception of the transmitted data by the receiver, such as the data bit rate. These same codewords are also utilized in the preferred embodiment of the present invention to control the transmission data bit rate of the transmitter, as will be described in detail shortly. Three message data bit rates are selectable with these four codewords, as shown in Table I of FIG. 2B, although it will be appreciated considerably more data bits rates may be selected with combination of the four codewords, and that the use of four codewords is by way of example only. Each word 1 codeword, word 2 codeword, word 3 codeword, and word 4 codeword is a sixteen bit binary word, such as a 15,7 BCH codeword with a single parity check bit. The word 1 codeword, word 2 codeword, word 3 codeword, and word 4 codeword correspond to the decimal numbers shown in Table I, and are selected so as to minimize false detection of the codewords when decoded. It will be appreciated that other codewords may be selected to minimize false detection, and those shown are by way of example only.

FIG. 2C shows typical waveforms for the second synchronization codeword 104 at 1200, 2400 and 4800 bit per second data bit rates. Second synchronization codeword 104 enables the receiver to obtain bit synchronization at the new data bit rate without loosing the word synchronization obtained at 1200 bits per second. As shown, the second synchronization codeword is thirty-two bits at 1200 bits per second and is correspondingly a greater number of bits at the higher data bit rates.

By providing the capability of flexible baud rate reception in the receiver, the system operator is provided with a number of options in the operation of the system. When system loading is low, or when system capacity is high due to only a small number of subscribers being on the service, transmission of the addresses and messages can be done at the lower baud rates, thereby providing the greatest reliability in message delivery. As system loading increases, the system operator can increase the address and message transmission baud rate to maintain message throughput. Alternately, short messages may be transmitted at a lower baud rate as the messages are able to be sent rapidly, whereas long messages which would take a long time to transmit, could be transmitted at the higher baud rates to increase message throughput.

FIG. 3 is an electrical block diagram of a transmitter having transmitter functions controllable by synchronized transmitter control signals interleaved with the message information. Transmitter 22 comprises a receiving means 200 for receiving the coded message signals from system controller 20. A decoder means, or decoder 208 coupled to the receiving means 200 decodes the received transmitter control signals, deriving transmission control signals. Transmission control signals may also be derived from one or more of the receiver control signals. The transmission control signals control such transmitter transmission functions as transmission delay, modulation and deviation control, low pass filter bandwidth, channel selection, transmitter keying and power control, as will be explained in detail shortly. Coupled to the receiving means 200 and to the decoding means 208 is the signal processing means 206 which processes the coded message signals for transmission. A transmitter means 216 couples to the receiving means through the signal processing means 206 which is part of transmitter means 216 for transmitting the coded message signals to the receivers 26 operating within the system.

Coded message signals are received at transmitter 22 from system controller 20 thru receiving means 200 comprising line driver 202 coupled to modem 204. Modem 204 converts the encoded analog data required for transmission over the telephone line into a binary bit stream suitable for processing by decoder 208. Modem 204 operates at the highest data rate the coded message signals are to be delivered, such as 4800 bits per second as shown in the preferred embodiment of the present invention.

Decoder 208 decodes the transmitter control signals synchronized with the message information and appropriate receiver control signals deriving transmission control signals. These control signals are preferably single control line binary control signals having logical zero and one states for activating and deactivating and for selecting the transmitter means functions. The transmission control signals include signals for controlling such transmitter means functions as transmission delay, deviation control, baud rate control, channel selection, transmitter keying and power control. It will be appreciated that other transmitter functions may be controlled, depending on the requirements of the particular transmission.

Signal processing means 206 comprises a delay means 210, a modulation means 212 and a low pass filter means 214. Delay means 210 delays the transmission of the coded message signals for a predetermined delay time interval. It will be appreciated the delay time interval set is a function of various transmitter parameters, such as the time required to key the transmitter or to change transmitter frequency. Delay means 210 may be implemented in a variety of ways, such as a clocked shift register. The length of the shift register can be variable, thereby providing a programmable delay means providing a plurality of predetermined delay time intervals. The shift register may also be bypassed, thereby providing no delay, or a zero delay time interval. In this instance, a sufficient number of additional bits 118 (FIG. 2A) are added to the first and second synchronization words to account for the time to effect the transmitter changes, without affecting either the transmitter or receiver decoders from obtaining bit and word synchronization.

Modulation means 212, in the preferred embodiment of the present invention, is an FM modulator providing FSK NRZ (frequency shift keying, no-return to zero) modulation having a deviation level control means 213 providing electronically selectable deviation signal levels. The choice of deviation signal level is a function of coded message signal baud rate selected for transmission, and can be varied over a deviation range, such as 3 to 5 KHz. In response to the transmitter control signals, the decoding means generates at least two transmission control signals for controlling deviation, such as one having a logical zero and logical one states, respectively for selecting either the first or second deviation signal level. The number of deviation signal levels selected is by way of example only, and it will be appreciated additional levels may be selected depending upon the requirements of the system.

Low pass filter means 214, in the preferred embodiment of the present invention, is an electronically controllable filter providing selectable low pass cut-off frequencies. The cut-off frequency selected is further a function of the coded message signal baud rate to prevent splatter into the adjacent radio frequency channels, in a manner well known to one of ordinary skill in the art. In response to the transmitter control information, the decoding means generates at least two transmission control signals for controlling low pass filter cut-off frequency, corresponding to a logical zero and logical one states, for selecting either the first or second cut-off frequency.

Transmitter means 216 comprises one or more electronically selectable channel elements 218, a buffer amplifier 220, one or more frequency multiplier or exciter stages 222 and 224, and a power amplifier having transmitter power control means 228. Electronically selectable channel elements 218 are especially useful in a nationwide paging service where local traffic is handled on one channel, and nationwide traffic is handled on a second channel.

Buffer amplifier 220 isolates the channel elements from the frequency multiplier and exciter stages 222 and 224, in a manner well known to one of ordinary skill in the art. The number of frequency multiplier and exciter stages 222 and 224 actually used are determined by the actual frequency of operation of the transmitter as compared to the actual channel element frequency, and transmitter output power desired, as is also well known to one of ordinary skill in the art.

In the preferred embodiment of the present invention, the transmitter output power can be controlled as a function of the coded message signal baud rate, although it will be appreciated small baud rate changes will not greatly affect receiver sensitivity at a given power level. The transmitter power output is increased, such as in 3 dB to 20 dB steps, thereby effecting consistent receiver sensitivities as the coded message signal baud rate is increased.

Figure 4:
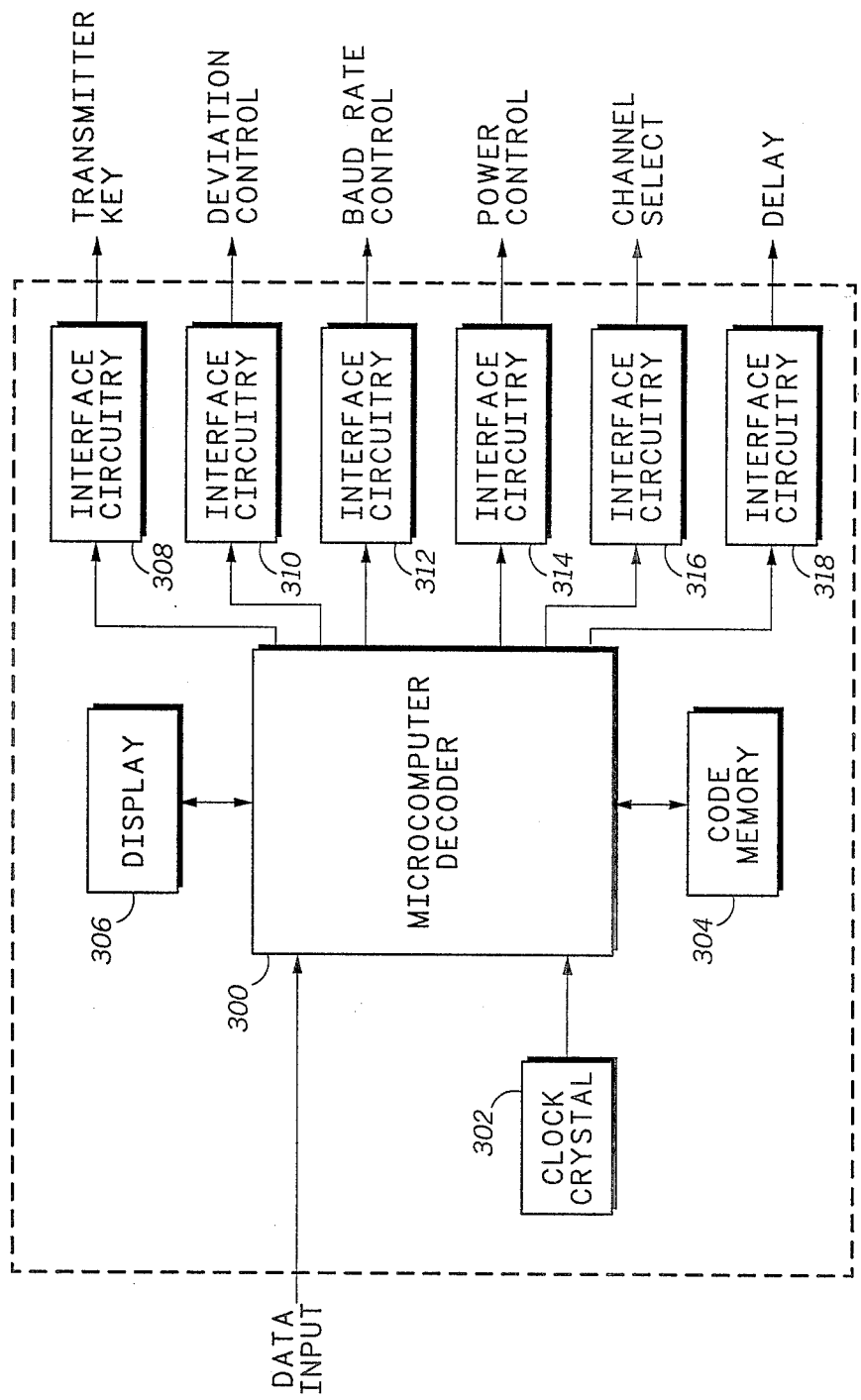
FIG. 4 is an electrical block diagram of the decoder of the preferred embodiment of the present invention.

Reference is directed to FIG. 4 which shows an electrical block diagram of the decoder, or decoding means 208. Decoding means 208 comprises a microcomputer decoder 300, a clock crystal 302, a code memory 304, a display 306, and interface circuits 308-316. Microcomputer decoder 300 receives the coded message signal bit stream from modem 204 at the data input through an I/0 port, comparing the receiver control signals located in the first synchronization codeword with predetermined codewords stored in code memory 304, generating transmission control signals when the transmitter control signals match the stored predetermined codewords. A microcomputer 300, such as an MC6809 microcomputer manufactured by Motorola Inc., provides the decoding and control functions. The use of a microcomputer for decoding and control functions is described in U.S. Pat. No. 4,518,961 issued May 21, 1985 to Davis et al, entitled "Universal Paging Device with Power Conservation" which is incorporated by reference herein. Display 306 allows on-site monitoring of the information as it is received, as well as for providing diagnostic information for troubleshooting. Interface circuits 308-316 couple to microcomputer decoder 300 through one or more I/O lines as required to provide the desired control functions. Interface circuits 308-316 provide the necessary electrical interface for controlling such transmitter functions as transmitter keying, deviation control, low pass filter cutoff frequency control (baud rate control), transmitter power output control transmission delay and channel selection.

Figure 5A:
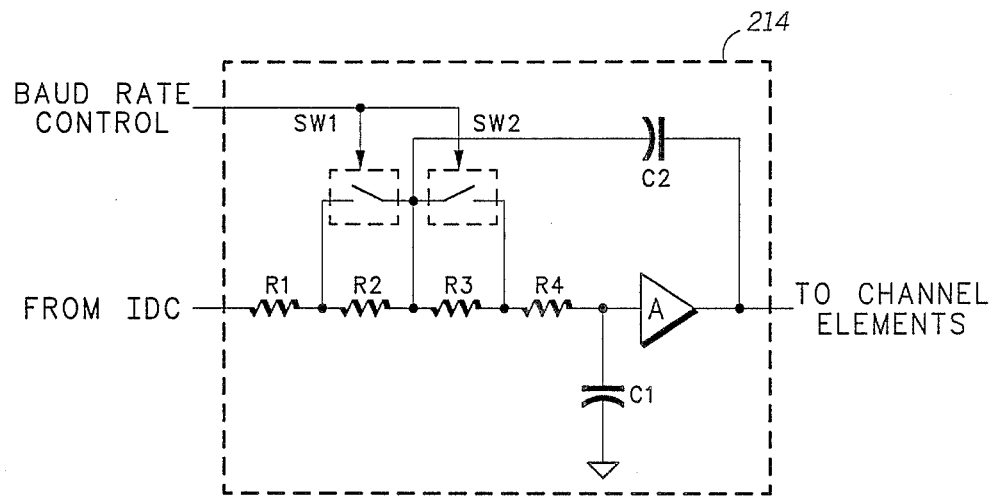
FIGS. 5A and 5B are electrical block diagrams showing alternate signal processing circuits for the present invention.

FIG. 5A shows an electrical schematic diagram of a switchable low pass filter suitable for use in the transmitter of the present invention. As shown, the baud rate control from interface circuit 312 is used to select one of the two cut-off frequencies by switching in and out resistors R2 and R3 by switching elements shown diagramatically as SW1 and SW2. It will be appreciated SW1 and SW2 may be implemented in a variety of ways, such as with relay controlled contact closures, or integrated circuit transmission gates.

Figure 5B:
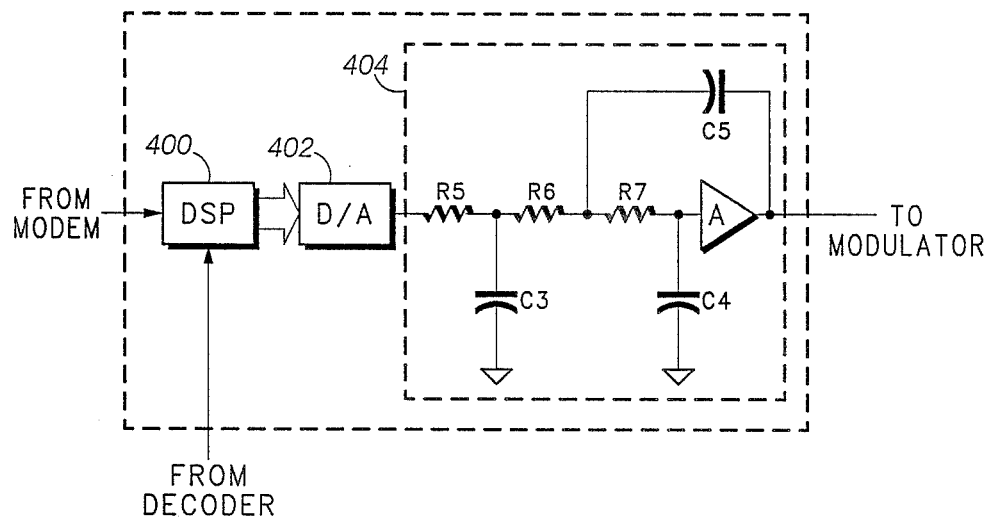

As the data bit rate is increased, it becomes more difficult to control splatter with a low pass filter as shown in FIG. 5A. An alternate approach which provides pulse shaping, is shown in FIG. 5B. One such pulse shaping method is described in U.S. Pat. No. 4,737,969, issued Apr. 12, 1988 to Steel et al entitled "Spectrally Efficient Digital Modulation Method and Apparatus" which is assigned to the assignee of the present invention and which is incorporated by reference herein. The coded message signal data bits from the modem are processed by a digital signal processor (DSP) 400, such as a MC56000 digital signal processor integrated circuit manufactured by Motorola, Inc. The output of DSP 400 is a binary waveform signal output corresponding to the pulse shape output in time. The output of DSP 400 couples to a D/A converter which converts the binary waveform signal to an analog voltage representative of the waveform voltage in time. D/A converter 402 couples to anti-aliasing filter 404, which in this case is a second order Butterworth filter, for filtering the D/A converter output and for removing any digitization noise from the signal. The output of anti-aliasing filter 404 couples to a conventional FM modulator input. By the use of pulse shaping techniques, a 20 dB reduction in adjacent channel splatter is achieved at a 1200 bit per second bit rate compared to conventional modulation methods. At 4800 bits per second, a 13 dB reduction in adjacent channel splatter is achieved compared to conventional modulation methods.

Figure 6A:
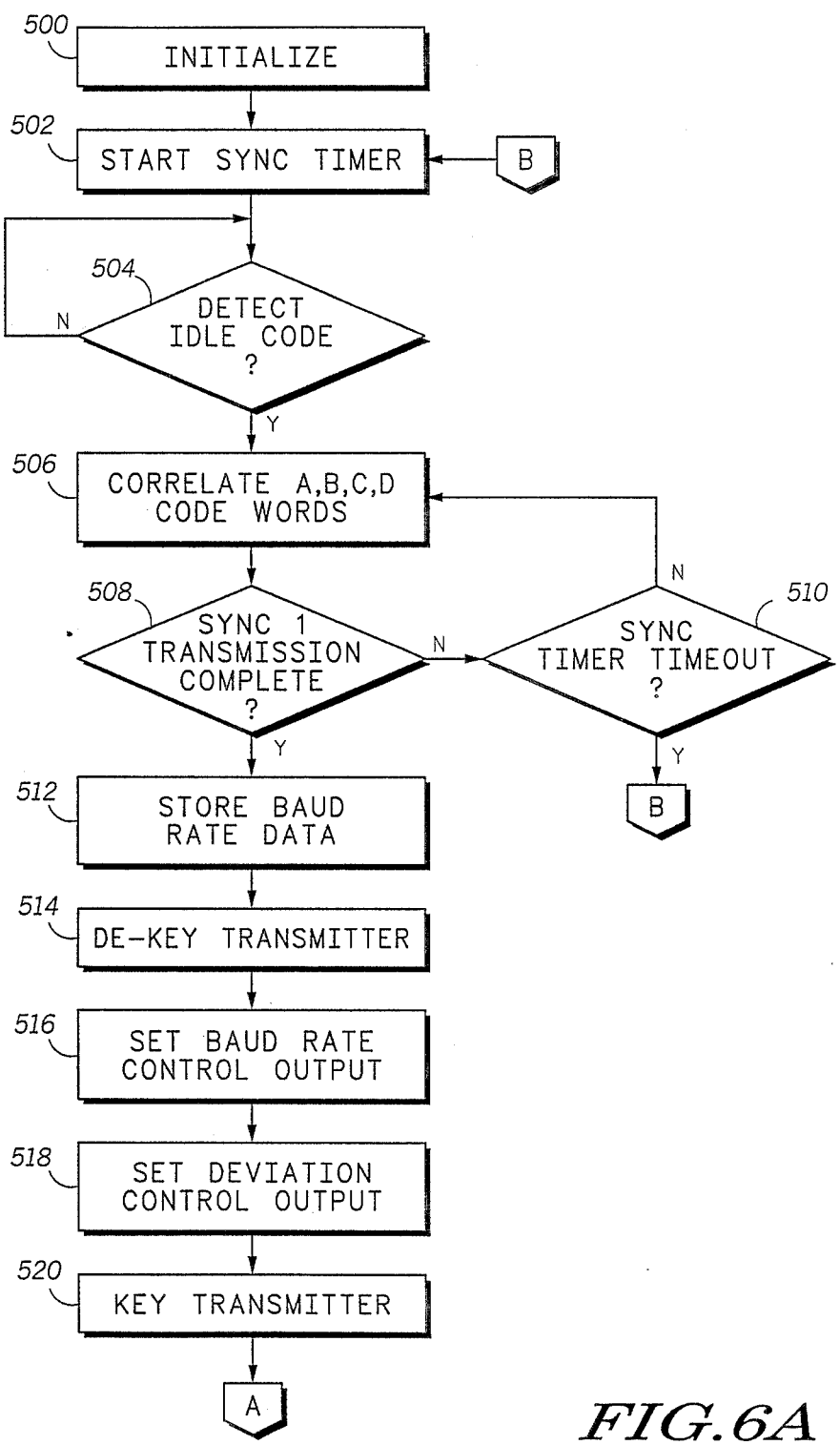
FIGS. 6A and 6B are flow charts describing the operation of the preferred embodiment of the present invention.
Figure 6B:
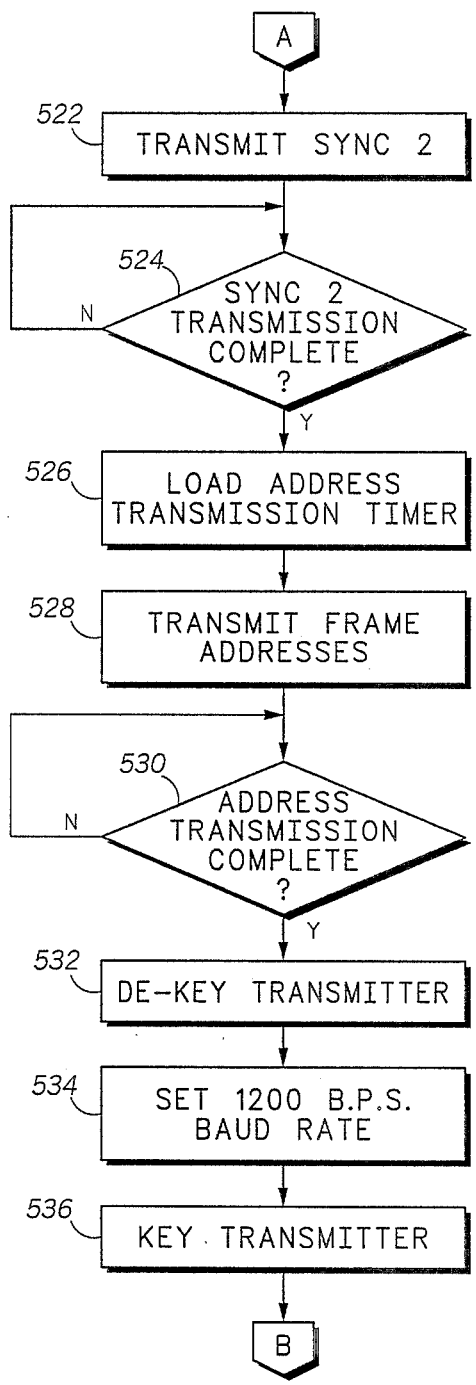

FIGS. 6A and 6B are flow charts describing the operation of the preferred embodiment of the present invention. At transmitter turn-on, the microprocessor is initialized, at block 500. Initialization includes such items as setting the transmitter for operation at 1200 bits per second and initializing the synchronization signal timer, or sync timer. The sync timer is started at block 502 and defines the time during which the microcomputer decoder looks to obtain bit and frame synchronization at 1200 bits per second. The decoder continues to evaluate the incoming data stream until the idle code is detected, at block 504, to establish bit and word synchronization. Once the idle code has been detected, the decoder begins correlation for the four receiver control codewords defining the baud rate at which the address and message segment is to be transmitted at block 506. If the four receiver control codewords have not been detected in the time before the sync timer times out, as shown at blocks 508 and 510, the sync timer is reset and restarted, at block 502. When the four receiver control codewords have been detected and sync 1 transmission is complete, at block 508, the baud rate data is stored in memory in the microcomputer, at block 512. The transmitter is then dekeyed, at block 514, the baud rate control output set, at block 516, setting the low pass filter cut-off frequency, and the deviation control output is set, at block 518, setting the corresponding deviation level. The transmitter is then re-keyed, at block 520, for transmitting the sync 2 portion, at block 522, at the new data bit rate. When the sync 2 transmission is complete, at block 524, the address timer is loaded, at block 526. The addresses and message are then transmitted, at block 528, at the new data bit rate. When address transmission is completed, at block 530, the transmitter is de-keyed, at block 532, and reset for transmission of the synchronization codeword at 1200 bits per second, at block 534. The transmitter is re-keyed for transmitting the next frame synchronization codeword, at block 536, and the cycle is repeated for each new frame of coded message signals being transmitted.

While the flow diagram of FIGS. 6A and 6B described only information relating to control of the low pass filter cut-off frequency and deviation control, it will be appreciated that similar procedures for decoding synchronized transmitter control signals embedded in the message information can be used to select multiple transmitter frequencies, transmitter power output levels, and selection of silent carrier, i.e. carrier transmitted without modulation. When sufficient bits are not provided in the sync 1 and sync 2 codewords to allow time to switch, it will also be appreciated the microcomputer would have selected an appropriate transmission delay prior to transmission of the coded message signals. Depending upon the transmission baud rate, the microcomputer may have also directed the incoming data to a modulator appropriate for transmission at that baud rate.

While specific embodiments of this invention have been shown and described, further modifications and improvements will occur to those skilled in the art. All modifications which retain the basic underlying principles disclosed and claimed herein are within the scope and spirit of the present invention.

We claim:

1. A transmitter, having controllable transmission functions, for transmitting coded message signals to a plurality of portable communication receivers, the coded message signals including message information interleaved with transmitter control signals and receiver control signals, the transmitter comprising:

receiving means, coupled to a communication link, for receiving the coded message signals transmitted thereon;

decoding means, coupled to said receiving means, for decoding the transmitter control signals and one or more of the receiver control signals, deriving transmission control signals in response thereto; and transmitting means, responsive to the transmission control signals for transmitting the coded message signals.

2. The transmitter according to claim 1, wherein said transmitter means includes signal processing means and responsive to the transmission control signals, for processing the coded message signals for transmission.

3. The transmitter according to claim 2, wherein said decoding means generates at least first and second transmission control signals for controlling the transmission of coded message signals at at least first and second baud rates, and wherein said signal processing means comprises:

modulation means, coupled to said receiving means, for modulating the coded message signals; and low pass filter means coupled to said modulation means, and having at least first and second selectable cut-off frequencies, said filter means responsive to the first transmission control signal for selecting the first cut-off frequency and further responsive to the second transmission control signal for selecting the second cut-off frequency.

4. The transmitter according to claim 3 wherein said modulation means comprises a frequency modulation (FM) modulator.

5. The transmitter according to claim 4, wherein said modulation means further comprises deviation level control means for generating at least first and second deviation signal levels.

6. The transmitter according to claim 5, wherein said deviation level control means being responsive to said first transmission control signal for selecting the first deviation signal level and further responsive to the second transmission control signal for selecting the second deviation signal level.

7. The transmitter according to claim 3 wherein said decoding means generating first and second transmission control signals for controlling carrier modulation, and wherein said modulation means being further responsive to the first transmission control signal for generating modulated carrier, and being further responsive to the second transmission control signal for generating an unmodulated carrier.

8. The transmitter according to claim 2 wherein said decoding means generating first and second transmission control signals for controlling the transmission of coded message signals, and wherein said transmitter means being further coupled to said decoding means and responsive to the first transmission control signal for keying said transmitter means, and being further responsive in the second transmission control signal for de-keying said transmitter means.

9. The transmitter according to claim 2 wherein the coded message signals transmitted by said transmitter means includes the message information interleaved with the communication receiver control signals.

10. The transmitter according to claim 3 wherein said signal processing means further comprising delay means, coupled to said receiving means and to said modulation means, for delaying the time of transmission of the coded message signals for a predetermined delay time interval.

11. The transmitter according to claim 10 wherein said delay means being programmable for providing a plurality of predetermined delay time intervals.

12. The transmitter according to claim 11 wherein said decoding means further generating first and second transmission control signals during transmission of coded message signals at first and second baud rates, and wherein said programmable delay means being responsive to the first transmission control signal for selecting a first predetermined delay time interval from the plurality of predetermined delay time intervals, and further responsive to the second transmission control signals for selecting a second predetermined delay time interval from the plurality of predetermined delay time intervals, thereby controlling the time of transmission of the coded message signals.

13. The transmitter according to claim 12 wherein said delay means further comprising programmable memory means for storing the first and second predetermined delay time intervals.

14. The transmitter according to claim 13 wherein either said first or said second predetermined delay time intervals may be zero.

15. The transmitter according to claim 1 wherein said transmitter means further comprising transmitter power control means for transmitting the coded message signals with at least first and second output power levels.

16. The transmitter according to claim 15, wherein said decoding means further generates a third transmission control signal for controlling the transmission of coded message signals at a first and second baud rates, and wherein said transmitter power control means being responsive to said first transmission control signal for selecting the transmission of the coded message signals at the first output power level, and being further responsive to the second transmission control signal for selecting the transmission of the coded message signals at the second output power level.

17. The transmitter according to claim 1 wherein said decoding means comprises a microprocessor.

18. The transmitter according to claim 1 wherein the coded message signals further include address signals to which the portable communications receivers are responsive for receiving the message signals and receiver control signals.

19. The transmitter according to claim 1 wherein said coded message signals are digital codewords.

20. The transmitter according to claim 1 wherein said decoding means comprises:

timing means for generating timing signals; and synchronization means, responsive to the synchronized transmitter control signals, for synchronizing the timing signals with the coded message signals received for transmission.

* * * * *

UNITED STATES PATENT AND TRADEMARK OFFICE
CERTIFICATE OF CORRECTION

PATENT NO. : 4,972,439

DATED : November 20, 1990

INVENTOR(S) : Kuznicki et al.

It is certified that error appears in the above-identified patent and that said Letters Patent is hereby corrected as shown below:

Col. 9, line 4, after "transmitter", insert --and receiver control signals, the transmitter and receiver control signals being synchronized with the message information, said transmitter--.

Col. 9, line 17, after "means" (second occurrence), insert --coupled to said receiving means--.

Signed and Sealed this

Nineteenth Day of May, 1992

Attest:

DOUGLAS B. COMER

*Attesting Officer*     *Acting Commissioner of Patents and Trademarks*